UNITED STATES PATENT OFFICE.

WILHELM HENNEBERG, OF BERLIN, GERMANY.

PROCESS FOR PRODUCING YOGHURT BEER.

1,228,916.  Specification of Letters Patent.  Patented June 5, 1917.

No Drawing.   Application filed April 27, 1914.   Serial No. 834,799.

*To all whom it may concern:*

Be it known that I, WILHELM HENNEBERG, of Berlin, a subject of the King of Prussia, and whose post-office address is 4 Seestrasse, Berlin, Kingdom of Prussia, German Empire, have invented a new and useful Process for Producing Yoghurt Beer; and I do hereby declare that the following is a full, clear, and exact description of my invention, which will enable others skilled in the art to which it appertains to make and use the same.

For the production of Yoghurt beer it has been proposed to first acidulate the beer by Yoghurt germs at a suitable temperature and then after cooling to ferment with yeast.

Experiments have shown that the Yoghurt germs are capable of acidulating beer in presence of yeast even at lower temperatures, especially if the germs have become adapted to symbiosis.

The present invention has for its object to produce Yoghurt beer by simultaneous fermentation and acidulation. For this purpose either the wort is set on with yeast and Yoghurt germs simultaneously, or first with the yeast and during the fermentation with the Yoghurt germs, the fermentation being carried on at a suitable temperature. The mixture of yeast and Yoghurt germs produced by this fermentation serves as ferment for fresh wort. The fermentation may be accelerated either by raising the temperature of fermentation (maximum temperature with regard to the yeast 30° C.) or by increasing the Yoghurt germs by an addition of a fresh culture or in both ways. The same effect may be obtained by fermenting the wort first in known manner with yeast and by adding Yoghurt germs, for instance in form of a wort culture. After the separation of the yeast the development of the Yoghurt germ and the acidulation of the beer will take place during the final fermentation.

The degree of acidity may be varied by the amount of addition of the liquid acidulated by the Yoghurt germ, for instance the wort. Sometimes it is preferable to inoculate the beer with the Yoghurt germs just before closing the bottles.

It is under certain circumstances advisable to treat not the wort but the mash, as the action is then quicker. In this case mashes are prepared in the usual way and cooled to the acidulation temperature (for example about 30° C.) before clarification and at this temperature inoculated with the Yoghurt germs. After sufficient acidulation the clarification takes place, but in such a way that the wort runs somewhat turbid, carrying away large portions of the Yoghurt germs. The acid wort thus produced is then set with yeast.

The process of simultaneous acidulation and fermentation can be much improved by suitable yeast, *i. e.*, a yeast which is acidulated under fermentation at a temperature suitable for the Yoghurt germs, for example about 30° C.

Such a process will serve to illustrate the invention and may be described as follows:—

A pure culture of yeast, for instance flaky pressed yeast, and the pure culture of Yoghurt are either mixed together or added separately, but almost at the same time, to the wort and cooled down to blood temperature. The wort will then become acidulated and will ferment. The said thermophile yeast has the property of settling well and quickly and of precipitating, taking with it a portion of the Yoghurt germs so that after the separation of the yeast the beer contains a sufficient quantity of Yoghurt germs and may be introduced immediately into bottles.

The sediment of yeast and Yoghurt germs may be used for setting up new fermentations.

The Yoghurt germs (*Bacillus Bulgaris*) remain alive for two or three weeks at the ordinary temperature of the room.

Experiments have shown that the life of the germs may be increased by a small addition of milk sugar or by a small increase of the amount of nitrogen of the beer, or by both, the germs isolated from milk being accustomed to milk sugar and a considerable amount of albumin present in the milk. The yeast culture for instance from wheat beer is not able to attack the milk sugar so that this remains available for the Yoghurt germs.

Albumin such as contained for instance in malt with a large amount of nitrogen is only partially taken up by the yeast so that the rest remains available for the Yoghurt germs. Small quantities (about 0.5% to 1.0%) of milk sugar and of albumin (for instance 0.5% peptone) are quite sufficient and of no influence on the beer.

I claim—

1. Process for producing Yoghurt beer consisting in preparing a suitable wort, adding to said wort germs of Yoghurt and germs of yeast simultaneously, allowing the wort to be acidulated and fermented thereby at a temperature up to 30° C., substantially as described.

2. Process for producing Yoghurt beer consisting in preparing a suitable wort, adding to said wort germs of Yoghurt and germs of yeast simultaneously, allowing the wort to be acidulated and fermented thereby at a temperature up to 30° C., and then adding fresh Yoghurt cultures, substantially as described.

3. Process for producing Yoghurt beer consisting in preparing a suitable wort, adding to said wort germs of Yoghurt and germs of yeast simultaneously, allowing the wort to be acidulated and fermented thereby at a temperature below 30° C., and then adding fresh Yoghurt cultures after fermentation, substantially as described.

4. Process for producing Yoghurt beer consisting in preparing a suitable mash, adding to said mash germs of Yoghurt and of yeast simultaneously, allowing the mash to acidulate and clarify in such a manner that a considerable portion of the Yoghurt germs remains in the clarified wort, substantially as described.

In testimony whereof I have hereunto set my hand in presence of two subscribing witnesses.

WILHELM HENNEBERG.

Witnesses:
  THEODOR STORT,
  GEORG RAEDER.

Copies of this patent may be obtained for five cents each, by addressing the "Commissioner of Patents, Washington, D. C."